United States Patent [19]
Fleege et al.

[11] Patent Number: 5,678,961
[45] Date of Patent: Oct. 21, 1997

[54] QUICK CHANGE ADAPTER

[76] Inventors: Dennis W. Fleege, 1002 Quarry Ave. SW., Cedar Rapids, Iowa 52404; Douglas P. VanWaart, 10885 Pauls Ct., Anamosa, Iowa 52205

[21] Appl. No.: 439,213

[22] Filed: May 11, 1995

[51] Int. Cl.⁶ ..................... B23B 31/107; B23B 31/22
[52] U.S. Cl. .................. 408/239 A; 279/75; 279/144; 279/905
[58] Field of Search ............... 279/74, 75, 143–145, 279/904, 905; 408/239 A

[56] References Cited

U.S. PATENT DOCUMENTS

| | | | |
|---|---|---|---|
| 2,736,561 | 2/1956 | Hansen | 279/75 |
| 3,039,781 | 6/1962 | Bilz | 279/75 |
| 3,251,605 | 5/1966 | Ondeck | 279/82 |
| 3,521,895 | 7/1970 | Smith | 279/22 |
| 3,767,218 | 10/1973 | Linthicum et al. | 279/75 |
| 3,893,677 | 7/1975 | Smith | 279/75 |
| 3,973,784 | 8/1976 | Smith | 408/239 A |
| 4,067,587 | 1/1978 | Derbyshire | 279/62 |
| 4,107,949 | 8/1978 | Wanner et al. | 279/75 |
| 4,174,113 | 11/1979 | Eckman | 279/19.4 |
| 4,184,692 | 1/1980 | Benson et al. | 279/75 |
| 4,290,617 | 9/1981 | Yoshida | 279/75 |
| 4,629,375 | 12/1986 | Lieser | 408/239 R |
| 4,648,608 | 3/1987 | Smith | 279/902 |
| 4,692,073 | 9/1987 | Martindell | 408/239 A |
| 4,786,221 | 11/1988 | March | 279/74 |
| 4,818,157 | 4/1989 | Kouvelis | 408/240 |
| 4,828,277 | 5/1989 | De Bastiani et al. | 279/75 |
| 4,861,201 | 8/1989 | Cuilleron | 408/139 |
| 4,874,181 | 10/1989 | Hsu | 408/239 A |
| 4,900,202 | 2/1990 | Wienhold | 408/240 |
| 4,944,641 | 7/1990 | Alves | 408/239 A |
| 4,946,179 | 8/1990 | De Bastiani et al. | 279/75 |
| 5,013,194 | 5/1991 | Wienhold | 408/240 |
| 5,015,129 | 5/1991 | Albin | 279/143 |
| 5,188,378 | 2/1993 | Erienkeuser | 279/22 |
| 5,464,229 | 11/1995 | Salpaka | 279/75 |

FOREIGN PATENT DOCUMENTS

| 4203158 | 8/1993 | Germany | 279/904 |
|---|---|---|---|

*Primary Examiner*—Steven C. Bishop
*Attorney, Agent, or Firm*—Wayne H. Stoppelmoor, Jr.

[57] ABSTRACT

A quick change adapter is provided for quickly changing a tool. The adapter includes a tubular-shaped inner member having an axial bore for receiving a shank of a tool, the inner member including a first portion and a second portion, the first portion having a diameter which is greater than a diameter of the second portion thereby defining a shoulder portion. The first portion includes at least one aperture extending between the outer surface and the axial bore. A ball is retained in the aperture and extends into the axial bore and beyond the outside surface of the inner member. The second portion of the inner member has an end which is adapted to be coupled to a tool chuck. A hollow tubular outer member is slidably mounted around the inner member and has a tapered inner wall therein and an end wall at one of its ends. A spring surrounds the second portion of the inner member and rests against the end wall at one end and rests against the shoulder portion at its other end. The spring biases the outer member in a direction which causes the tapered inner wall to forcibly engage the set of balls thereby forcing the balls inward towards the axial bore, thus clamping and retaining the shank of the tool axially and rotationally therein.

20 Claims, 5 Drawing Sheets

QUICK CHANGE ADAPTER

FIELD OF THE INVENTION

This invention relates generally to tool chuck type of devices and, more specifically, to a quick change adapter for providing a means for quickly changing tools.

BACKGROUND OF THE INVENTION

It is common when using a hand-held power tool, such as a drill, to continuously be changing tools, such as from screw driver bits to drill bits to grinding bits to countersink bits and so on. This is time consuming and requires repetitive removal and insertion of tools into a tool chucking device, tightening or loosening the chucking device and grasping onto a power tool all at the same time. Additionally, the user must keep track of the chuck key which is used to secure and release the tools from the drill. Therefore, there is a need for a device that will allow the user to quickly change from one tool to another without the aforementioned problems.

Some devices of the prior art try to solve the abovementioned problems by providing a keyless chuck that is secured to the spindle of the drill which allows faster changing of tool bits. One such device is shown in U.S. Pat. No. 3,767,218 entitled "Tool Chuck" and the disclosure therein is incorporated herein by reference. The aforementioned tool chuck shown in U.S. Pat. No. 3,767,218 requires many parts and is difficult to manufacture. For instance, the aforementioned tool chuck requires two sets of three balls to align and secure the tool within the tool chuck. Furthermore, the tool chuck shown in U.S. Pat. No. 3,767,218 is an integral part of the spindle of the tool, thereby reducing the versatility of its use. Other devices of the prior art are placed into the chuck of a power tool, however, they require special tool bits to operate, thereby reducing the versatility of the tool. The prior art devices require many parts to manufacture and are more labor intensive to manufacture.

Therefore, there is a distinct need to provide a more versatile way to solve these and other problems of the prior art. Additionally, it is desirous to provide an adapter that requires less parts to facilitate easier manufacture.

SUMMARY OF THE INVENTION

It is a general object of the present invention to provide an assembly which allows tools to be easily and quickly changed on a power tool.

It is a more specific object of the present invention to provide an adapter that allows multiple tools to be easily exchanged on the power tool thereby allowing the flexibility of being able to interchange the tools quickly and securely without the need for special tools or to open and close the jaws of a chuck.

In accordance with a preferred embodiment of the present invention an adapter is provided for quickly changing a tool. The adapter includes a tubular-shaped inner member having an axial bore for receiving a shank of a tool, the inner member including a first portion and a second portion, the first portion having a diameter which is greater than a diameter of the second portion thereby defining a shoulder portion. The first portion includes at least one aperture extending between the outer surface and the axial bore. A ball is retained in the aperture and extends into the axial bore and beyond the outside surface of the inner member. A hollow tubular outer member including a tapered inner wall and an end wall at one end is slidably mounted around the inner member. A spring surrounds the second portion of the inner member and rests against the end wall at one end and rests against the shoulder portion at its other end. The spring biases the outer member in a direction which causes the tapered inner wall to forcibly engage the set of balls thereby forcing the balls inward towards the axial bore, thus clamping and retaining the shank of the tool axially and rotationally therein.

In accordance with another aspect of the preferred embodiment of the present invention a quick change adapter is provided which allows a tool to be easily exchanged on a power tool thereby allowing the flexibility of being able to interchange a plurality of tools quickly. The quick change adapter includes a hollow outer member having a tapered inner wall and an inner member disposed within the outer member. The inner member is adapted to be coupled to a spindle of the power tool at one end and has an axial bore in its other end for receiving the tool. The inner member includes a first portion and a second portion, the first portion has a diameter which is greater than a diameter of the second portion thereby defining a shoulder portion. A spherical member is disposed in an aperture within the fast portion of the inner member between the tool and the tapered inner wall of the outer member. A spring is disposed around the second portion or the inner member and between an end portion of the outer member and the shoulder portion of inner member, the spring biases the outer member axially thereby forcing the spherical member into engagement with the tool. A retaining means is disposed on the inner member for retaining the outer member around the spherical member.

BRIEF DESCRIPTION OF THE DRAWINGS

Other objects and advantages of the invention will be apparent from the following detailed description and the accompanying drawings in which.

Figure 1:
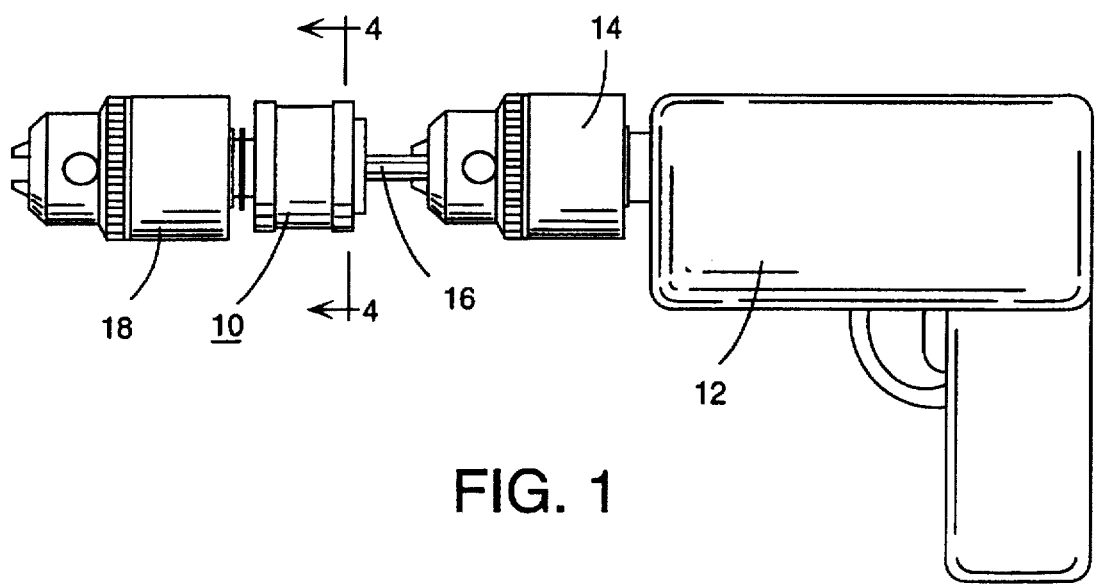
FIG. 1 shows a side view of a quick change adapter in accordance with one version of the present invention being coupled to a driver bit and a drill chuck.

While the invention is susceptible to various modifications and alternative forms, a specific embodiment thereof has been shown by way of example in the drawings and will be described in detail. It should be understood, however, that it is not intended to limit the invention to the particular form described, but on the contrary, the invention is to cover all modifications, equivalents, and alternatives falling within the spirit and scope of the invention as defined by the appended claims.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

As shown in FIG. 1, a preferred embodiment of a quick change adapter in accordance with the present invention is designated generally by the reference character 10. As shown, the quick change adapter 10 is adapted to be rotatably driven by a tool such as a drill 12 having a traditional drill chuck 14 secured thereto. The quick change adapter 10 is shown having one end coupled to a tool or driving bit 16 which is secured in the drill chuck 14 in a traditional manor. The opposite end of the adapter 10 is coupled to one end of a second traditional drill chuck 18. Instruments such as drill bits, screw driver bits, etc. may be secured in a second end of the second chuck 18 in a traditional manor first and second drill chucks 14 and 18 are commercially available from many resources.

Figure 2:
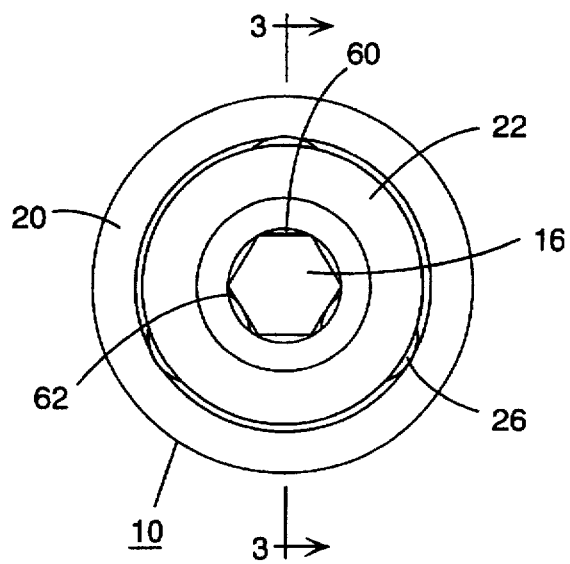
FIG. 2 is an end view of the quick change adapter of FIG. 1.
Figure 3:
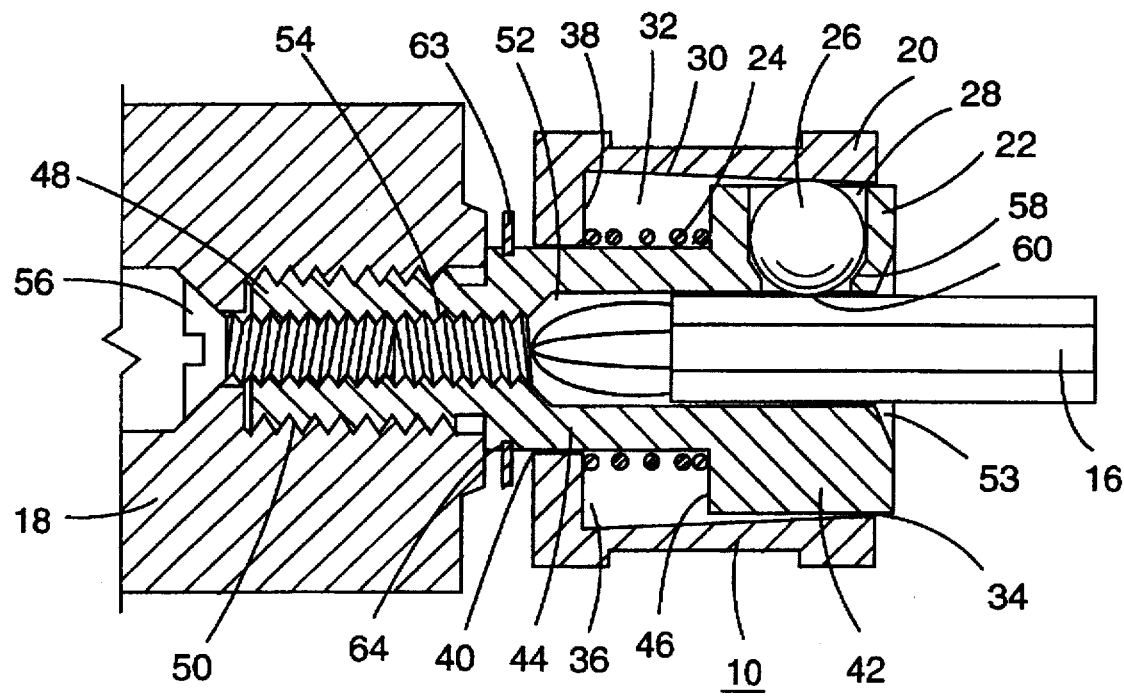
FIG. 3 is a longitudinal sectional view of the quick change adapter of FIG. 1, taken generally along the line 3—3 of FIG. 2.
Figure 4:
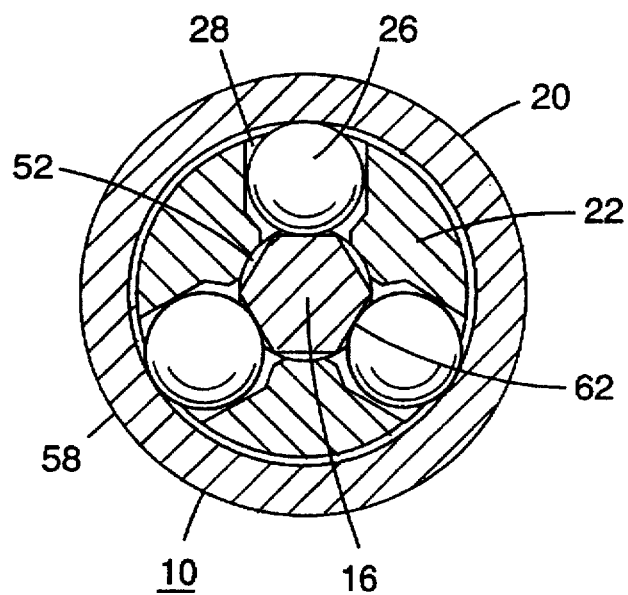
FIG. 4 is an end section view of the quick change adapter of FIG. 1, taken generally along the line 4—4 of FIG. 1.

As shown in FIGS. 2–4, the quick change adapter 10 includes a hollow outer member or sleeve 20, a cylindrical shaped inner member 22, a compression spring 24 and a set of spherically shaped balls 26 disposed in corresponding circular apertures 28 in the inner member 22. The outer member 20 surrounds the inner member 22 and encapsulates the balls 26 within the apertures 28.

The outer member 20 is cylindrical in shape and has a tapered inner surface or wall 30 which defines an inner bore 32. The diameter of the inner bore 32 at an open first end 34 is slightly larger than the outside diameter of the inner member 22 and increases towards a second end 36. The second end 36 of the outer member 20 has an annular shoulder flange or end wall 38 having an opening 40 therein.

The inner member 22 has an enlarged first end portion 42 and a reduced middle portion 44 defining a shoulder portion 46 against which one end of the compression spring 24 rests against. The other end of the spring rests against the shoulder flange 38 of the outer member 20. The inner member 22 has a second end 48 extending outwardly through the opening 40 in the outer member 20 and having external threads 50 which are adapted to be engaged with corresponding threads in the second drill chuck 18 thereby allowing the adapter 10 to be secured to the second drill chuck 18.

The inner member 22 has an axial inner bore 52 therein having a first diameter at one end large enough to receive the driving bit 16 which extends outwardly from the drill chuck 14. A conical shaped tapered surface 53 is provided at the first end of the inner bore 52 to allow the driving bit 16 to be easily positioned into the inner bore 52. The inner member inner bore 52 has a second diameter at its second end which is smaller than the first diameter and having internal threads 54 therein which are adapted to receive a screw 56 thereby assuring that the second drill chuck 18 remains securely attached to the adapter 10.

The apertures 28 are radially spaced equidistant apart in the inner member 22. Each aperture retains one of the balls 26 between the driving bit 16 and the tapered inner wall 30 of the outer member 20. The balls 26 are prevented from falling into the bore 52 when the adapter 10 is removed from the driver bit 16 (FIG. 5) by a tapered edge 58 along the bottom of the apertures 28 adjacent to the bore 52. A portion 60 of the balls 26 extends inward from the inner member 22 and into the bore 52 for engagement with the driving bit 16. Instead of utilizing the tapered edge 58, the apertures 28 could be conically shaped with the inner portion diameter adjacent to the driving bit 16 being smaller than the diameter of the balls 26 thereby preventing the balls 26 from falling into the bore 52 when the adapter 10 is removed from the driving bit 16.

Generally, the compression spring 24 is axially retained by the shoulder 46 at one end and the shoulder flange 38 at its second end. More specifically, the compression spring 24 surrounds the middle portion 44 of the inner member 22 and has one end that engages the shoulder 46 of the inner member 22 and an opposite end that engages the shoulder flange 38 of the outer member 20 to bias the outer member 20 to the normal retaining position shown in FIG. 3. The outer member 20 has forward slidable movement relative to the inner member 22, opposing the spring bias force, for disengaging the quick change adapter 10 from the driving bit 16.

The outer member 20 is biased axially towards the second end of the inner member 22 by the compression spring 24 which rests against the shoulder flange 38 of the outer member 20 and the shoulder portion 46 of the of inner member 22. This causes the tapered inner wall 30 of the outer member 20 to contact external surfaces of the spherical balls 26 and commonly direct the spherical balls 26 radially inward toward the inner bore 52 within the inner member 22 and engaging a flat portion 62 of the driving bit 16, thereby securing the driving bit 16 within the inner bore 52 and preventing the driving bit 16 from rotating within the inner bore 52. Rotational forces applied to the driving bit 16 by the drill 12 are transmitted to the adapter 10 by the radial forces from the flat portions 62 of the driving bit 16 to the balls 26. The driving bit 16 is thus securely held within the adapter 10. Axial forces tending to pull the driving bit 16 removably from the adapter 10 causes a corresponding rotational force on the balls 26 which in turn, causes an axial force to be exerted on the tapered inner wall 30 in a direction opposite the force exerted on the driving bit 16. This force exerted on the outer member 20 will tend to move the outer member 20 axially in the direction of the second end 48 of the inner member 22, thus increasing the radially inward forces exerted by the outer member inner wall 30 to the balls 26, thereby increasing the clamping force to the driving bit 16.

A plurality of balls are shown in FIG. 4, however, the same result can be achieved by using only one ball in a single aperture. The inner bore 52 concentrically aligns the driving bit 16 therein thereby only requiring the balls 26 to be utilized to clamp the driving bit 16 in place.

Figure 5:
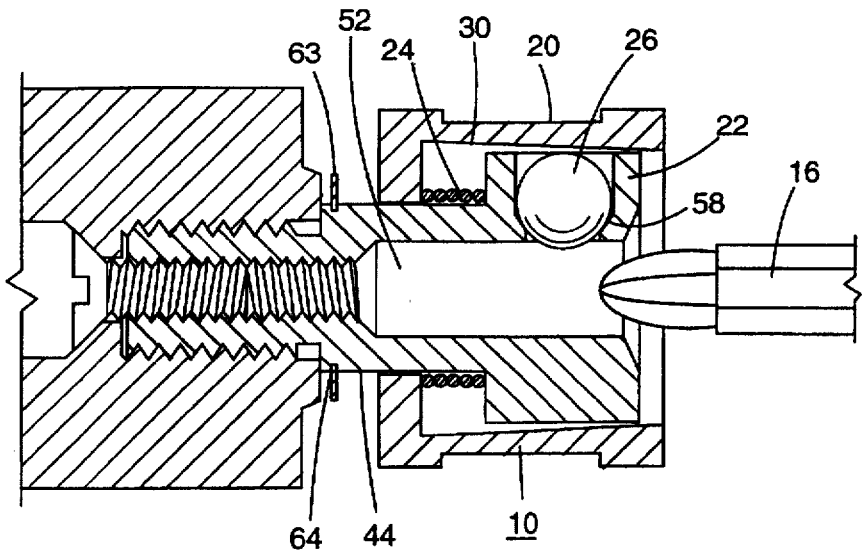
FIGS. 5 shows the quick change adapter of FIG. 1 with the outer body in the release position.
Figures 5A, 5B:
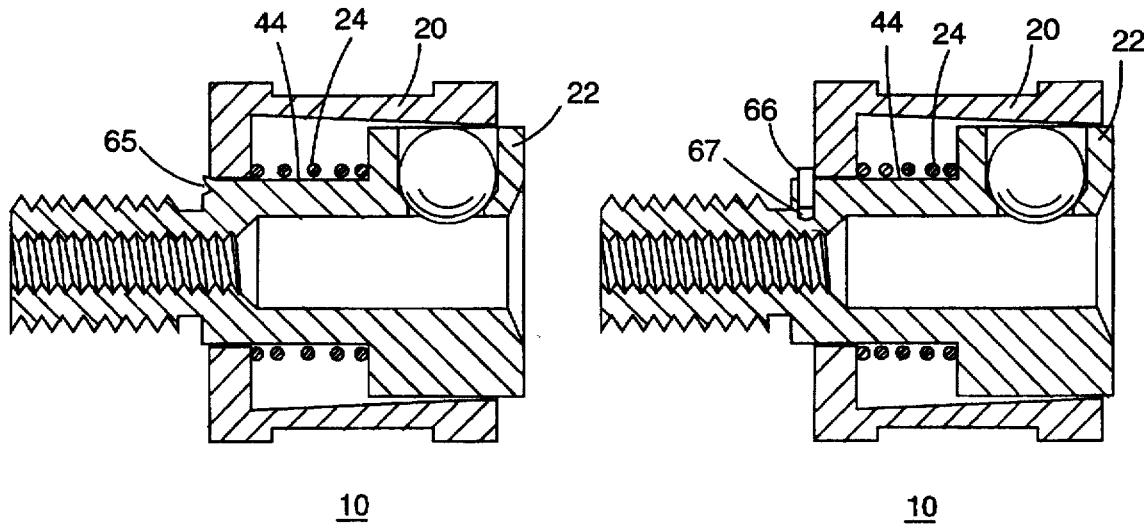
FIG. 5a shows the quick change adapter of FIG. 1 with an alternate method of retaining the outer member around the inner member.
FIG. 5b is the quick change adapter of FIG. 1 with an alternate method of retaining the outer member around the inner member.

FIGS. 5, 5a and 5b show the outer member 20 is prevented from sliding off of the assembly when the driving bit 16 is removed from the adapter 10 by a retaining ring 63. When the driving bit 16 is held in the adapter 10 the spherical balls 26 are in contact with the tapered inner wall 30 thereby holding the outer member 20 axially around the inner member 22. However, when the driving bit is removed from the adapter 10 the balls 26 are recessed into the apertures 28 and do not contact the inner wall 30, therefore, the outer member 20 may slide axially off of the inner member 22. When the adapter 10 is coupled to the second drill chuck 18 the outer member is prevented from sliding off of the inner member 22 by engaging the second drill chuck 18. When the adapter 10 is removed from the second drill chuck 18 the outer member 20 is prevented from sliding off of the inner member 22 by the retaining ring 63 which is secured around the inner member 22 in a groove 64 around the external surface of the middle portion 44 of the inner member 22. The retaining ring 63 is located outside of the hollow outer member 20 and limits the axial movement of the outer member 20 caused by the compression spring 24 thereby preventing the outer member from sliding off of the inner member 22. The retaining ring 63 can be any conventional ring such as a c-ring or an e-ring. FIG. 5a shows that the retaining ring 63 can be replaced with a portion of the end of the middle portion 44 being displaced by a staked up portion 65 that is created by a conventional staking process. The staked up portion 65 is larger than the diameter of the opening 40 in the outer member thereby preventing the outer member from sliding past the end of the middle portion 44 of the inner member 22. FIG. 5b shows a pin 66 disposed in an aperture 67 in the middle portion 44 that limits the outer member axial movement.

As shown in FIG. 5, to remove the adapter 10 from engagement with the driving bit 16, it is necessary to displace the outer member 20 in the direction of the driving bit 16, compressing the spring 24. This displacement of the outer member 20 removes the force that the inner wall 30 applies to the balls thereby removing the force that the balls 26 apply onto the driving bit 16. This removal of the force eliminates the gripping force that the balls are applying to the driving bit 16, thereby allowing the adapter 10 to be removed from the driving bit 16. When the adapter has been removed from the driving bit 16, the compression spring 24 moves the outer member 20 back into the normal position.

Figure 6:
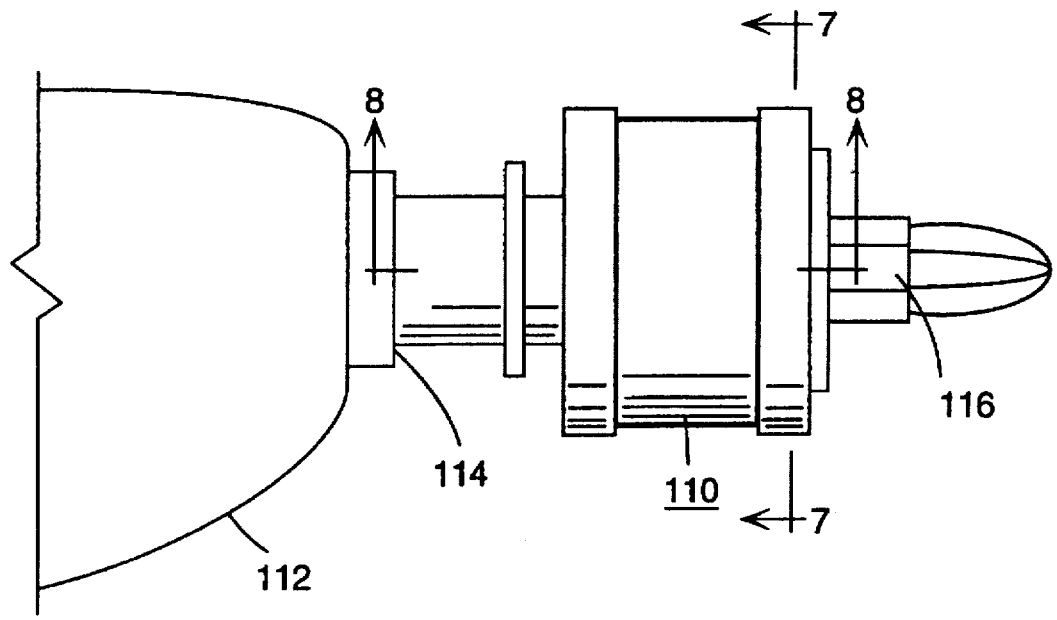
FIG. 6 is a side view of the quick change adapter in accordance to an alternate embodiment of the present invention.

Referring now to FIG. 6, another embodiment of a quick change adapter in accordance with the present invention is shown designated generally by reference character 110. As shown, the quick change adapter 110 is adapted to be rotatably driven by a tool such as a drill 112 (partially shown having a traditional drill chuck spindle 114).

Figure 7:
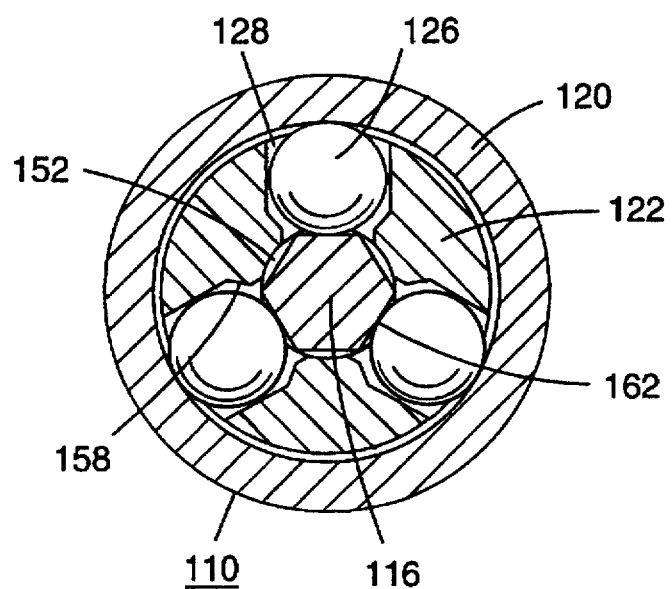
FIG. 7 is an end section view of the quick change adapter of FIG. 6, taken generally along the line 7—7 of FIG. 6.
Figure 8:
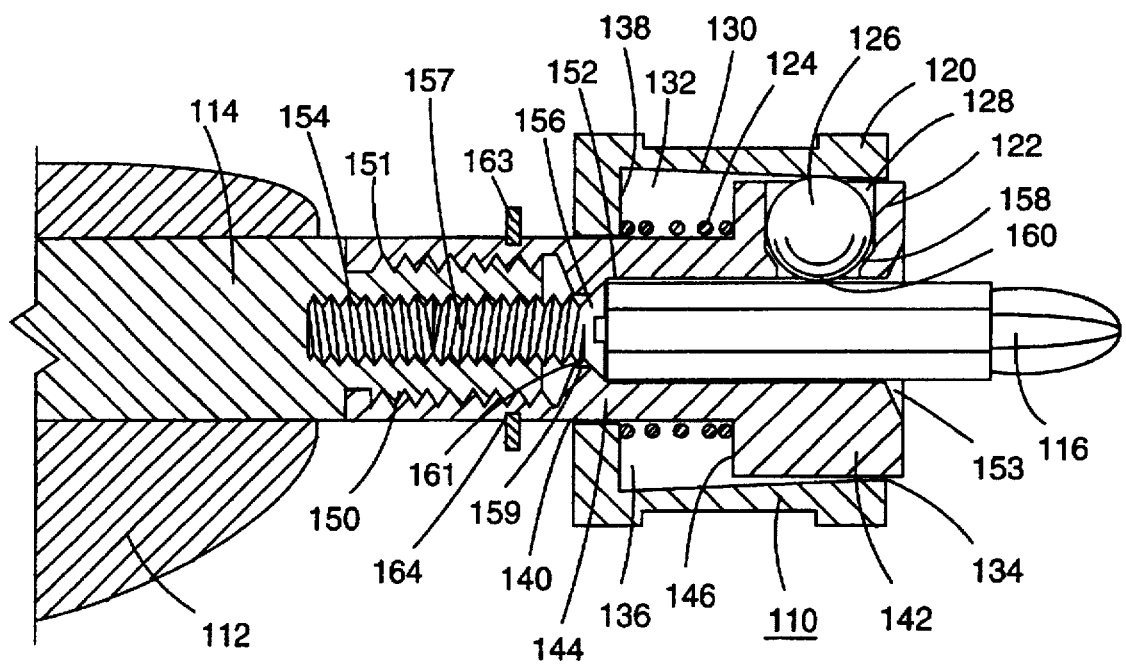
FIG. 8 is a longitudinal sectional view of the quick change adapter of FIG. 6, taken generally along the line 8—8 of FIG. 6.

As shown in FIGS. 7 and 8, the quick change adapter 110 includes a hollow outer member or sleeve 120, a cylindrical shaped inner member 122, a compression spring 124 and a set of spherically shaped balls 126 disposed in corresponding circular apertures 128 in the inner member 122. The outer member 120 surrounds the inner member 122 and encapsulates the balls 126 within the apertures 128.

The outer member 120 is cylindrical in shape and has a tapered inner surface or wall 130 which defines an inner bore 132. The diameter of the inner bore 132 at an open first end 134 is slightly larger than the outside diameter of the inner member 122 and increases towards a second end 136. The second end 136 of the outer member 120 has an annular shoulder flange 138 having an opening 140 therein.

The inner member 122 has an enlarged first end portion 142 and a reduced second portion 144 defining a shoulder portion 146 against which one end of the compression spring 124 rests against. The other end of the spring rests against the shoulder flange 138 of the outer member 120. The second portion 144 of the inner member 122 extends outwardly through the opening 140 in the outer member 120 and has internal threads 150 which are adapted to be engaged with corresponding threads on the drill spindle 114 thereby allowing the adapter 110 to be secured to the drill 112.

The inner member 122 has an axial inner bore 152 therein having a first diameter at a first end for receiving a driving bit 116 therein. A conical shaped tapered surface 153 is provided at the first end of the inner bore 152 to allow the driving bit 116 to be easily positioned into the inner bore 152. The inner bore 152 has a second diameter at its opposite end which has internal threads 150 for receiving the end of the drill spindle 114 which has corresponding external threads 151. The inner bore 152 has a middle ridge portion 159 for retaining a screw 156. The ridge 159 defines a hole 161 for allowing a screw shaft 157 to pass therethrough. The screw shaft 157 passes through the hole 161 and into a drill spindle threaded inner bore 154, thereby assuring that the adapter 110 remains securely attached to the drill spindle 114. The screw is not required because the mating of the internal threads 150 with the external threads 151 of the drill spindle will hold the adapter securely to the drill spindle; however, the screw is provided to assure that the adapter 110 remains securely attached to the drill spindle 114.

The apertures 128 are radially spaced in the inner member 122. Each aperture retains one of the balls 126 between the driving bit 116 and the tapered inner wall 130 of the outer member 120. The balls 126 are prevented from falling into the bore 152 within the inner member 122 when the driver bit 116 is removed from the bore 152 by a tapered edge 158 along the bottom of the apertures 128 adjacent to the bore 152. A portion 160 of the balls 126 extends inward from the inner member 122 and into the inner bore 152 for engagement with the driving bit 116. Instead of utilizing the tapered edge 158, the apertures 128 could be conically shaped with the inner portion diameter adjacent to the driving bit 116 being smaller than the diameter of the balls 126 thereby preventing the balls 126 from falling into the bore 152 when the driver bit 116 is removed from the bore 152.

The compression spring 124 is axially retained by the shoulder 146 at one end and the shoulder flange 138 at its second end. More specifically, the compression spring 124 surrounds the second portion 144 of the inner member 122 and has one end that engages the shoulder 146 of the inner member 122 and an opposite end that engages the shoulder flange 138 of the outer member 120 to bias the outer member 120 to the normal retaining position shown in FIG. 8. The outer member 120 has forward slidable movement relative to the inner member 122, opposing the spring bias force, for disengaging the driving bit 116.

The outer member 120 is biased axially towards the second end of the inner member 122 by the compression spring 124 which rests against the shoulder flange 138 of the outer member 120 and the shoulder portion 146 of the of inner member 122. This causes the tapered inner wall 130 of the outer member 120 to commonly direct the spherical balls 126 radially inward to the inner bore 152 within the inner member 122 and engaging a flat portion 162 of the driving bit 116, thereby securing the driving bit 116 within the inner bore 152 and preventing the driving bit 116 from rotating within the inner bore 152. Rotational forces applied to the driving bit 116 by the drill 112 are transmitted from the adapter 110 by the radial forces to the flat portions 162 of the driving bit 116 by the balls 126. The driving bit 116 is thus securely held within the adapter 110. Axial forces tending to pull the driving bit 116 removably from the adapter 110 causes a corresponding rotational force on the balls 126 which in turn, causes an axial force to be exerted on the tapered inner wall 130 in a direction opposite the force exerted on the driving bit 116. This force exerted on the outer member 120 will tend to move the outer member 120 axially in the direction of the drill 112, thus increasing the radially inward forces exerted by the outer member inner wall 130 to the balls 126, thereby increasing the clamping force to the driving bit 116.

Figure 8A:
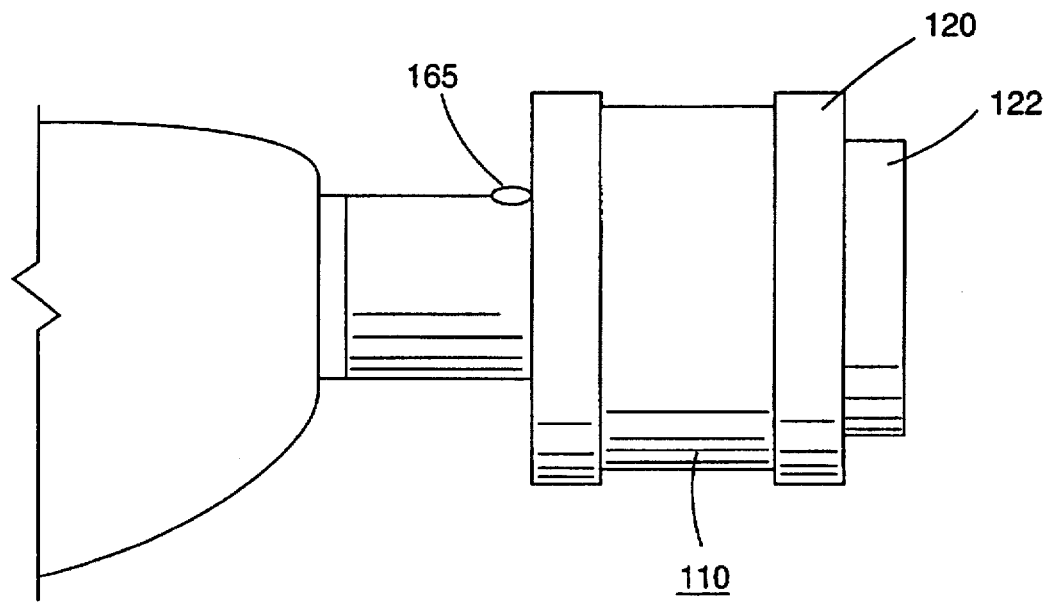
FIG. 8a shows the quick change adapter of FIG. 6 with an alternate method of retaining the outer member around the inner member.

The second portion 144 of inner member 122 has a groove 164 around its external surface which accepts a retaining ring 163 therein. The retaining ring 163 limits the axial movement of the outer member 120 caused by the compression spring 124 in the absence of the driving bit 116. FIG. 8a shows an alternate method of limiting the axial movement of the outer member 120. A portion of the second portion 144 is pinched creating an embossment 165 having a size which is large enough to limit the movement of the outer member 120.

In order to remove the driver bit 116 from the quick change adapter 110, it is necessary to displace the outer member 120 in the direction of driving bit 116, compressing the spring 124, thereby removing the force which is being applied to the balls 126 by the inner wall 130. This removal of the force from the balls eliminates the gripping force that the balls are applying to the driving bit 116, thereby allowing the driving bit 116 to be removed. When the driving bit 116 has been removed, the compression spring 124 moves the outer member 120 back into the normal position.

The present invention solves the problems of the prior art by efficiently utilizing a minimal number of parts while allowing the user to quickly change tools. For example, the present invention only require the spherical balls to clamp and secure the tool within the quick change adapter and while not requiring the spherical balls to align the tool, therefore, only one spherical ball is required for the present invention thereby reducing the number of parts required to manufacture. Additionally, the present invention is not required to be secured to the spindle of the power tool thereby increasing the versatility of the invention.

While there have been shown and described what are at present considered the preferred embodiments of the invention, it will be obvious to those skilled in the art that various changes and modifications may be made therein without departing from the scope of the invention as defined by the appended claims.

What is claimed is:

1. An adapter for quickly changing a tool wherein the tool having a flat surface, said adapter comprising:

a tubular-shaped inner member having an axial bore for receiving the tool, said inner member including a first portion and a second portion, said first portion having a diameter which is greater than a diameter of said second portion thereby defining a shoulder portion;

said first portion including at least one aperture extending between an outer surface and said axial bore;

a ball retained in said aperture and extending into said axial bore and beyond an outside surface of the inner member;

a hollow tubular outer member having a tapered inner wall and an end wall at one end slidably mounted around said inner member; and a spring surrounding said second portion of said inner member and resting against said end wall at one end and resting against said shoulder portion at its other end, said spring biasing said outer member in an axial direction which causes said tapered inner wall to forcibly engage said ball thereby forcing said ball inward to engage the flat surface of the tool, wherein said ball retaining the tool within said axial bore and preventing the tool from rotating within said axial bore.

2. An adapter according to claim 1, wherein said inner member further having an end portion having a threaded outer surface for coupling said adapter to a tool chuck.

3. An adapter according to claim 2, wherein said inner member further having a threaded internal bore, disposed in said end portion having said threaded outer surface, for receiving a threaded rod therein.

4. An adapter according to claim 1, wherein said axial bore concentrically aligns the tool.

5. An adapter according to claim 1, wherein said outer hollow tubular member is one piece.

6. An adapter according to claim 1 further including retaining means for retaining said outer member around said inner member.

7. An adapter according to claim 6, wherein said retaining means including a retaining ring surrounding said inner member.

8. An adapter according to claim 6, wherein said retaining means includes flaring a portion of the end of the inner member.

9. An adapter according to claim 6, wherein said retaining means includes a pin extending from said inner member.

10. An adapter according to claim 1, wherein the diameter of said aperture adjacent to said axial bore is smaller than the diameter of said aperture adjacent the outside surface of said first portion thereby retaining said ball therein.

11. A quick change adapter being adapted to be quickly coupled and de-coupled to a driver bit at one end and adapted to be coupled to a tool chuck at its other end wherein the driver bit having a flat surface, said adapter comprising:

an inner member being adapted to be coupled to the tool chuck at one end and having an axial bore in its other end for receiving the driver bit, said inner member including a first portion and a second portion, said first portion having a diameter which is greater than a diameter of the second portion thereby defining a shoulder portion;

said inner member further including a third portion extending from said second portion, said third portion having a threaded outer surface thereby being adapted for threading into the tool chuck;

at least one aperture in said inner member;

an one piece hollow outer member having a tapered inner wall surrounding said inner member, said outer member being slidable along said inner member;

a ball retained in each of at least one of said apertures, said ball being retained between the driver bit and said outer member, said ball having a portion which extends into said axial bore;

a spring, positioned between said inner member and said outer member, for biasing said outer member along the inner member to force said tapered inner wall against said ball and forcing said ball into engagement with the flat surface of the driver bit, wherein said ball forcibly engaging the driver bit for (i) preventing the driver bit from axial movement within said axial bore and (ii) preventing the driver bit from rotational movement within said axial bore; and retaining means for retaining said outer member around said inner member.

12. An adapter according to claim 11, wherein said third portion further having a threaded internal bore being adapted to accept a threaded rod therein.

13. An adapter according to claim 11, wherein said retaining means including a retaining ring surrounding said inner member.

14. An adapter according to claim 11, wherein said retaining means includes a flared portion disposed at one end of the inner member.

15. An adapter according to claim 11, wherein said retaining means includes a pin extending from said inner member.

16. A quick change adapter which allows a tool having a flat surface to be easily changed on a power tool thereby allowing the flexibility of being able to interchange a plurality of tools quickly, said adapter comprising:

a hollow outer member having a tapered inner wall;

an inner member disposed within said outer member, said inner member being adapted to be coupled to a spindle of the power tool at one end and having an axial bore in its other end for receiving the tool therein, said inner member including a first portion and a second portion, said first portion having a diameter which is greater than a diameter of said second portion thereby defining a shoulder portion;

a spherical member disposed in an aperture within said first portion of said inner member between the tool and said tapered inner wall of said outer member;

a spring disposed around said second portion of said inner member and between an end portion of said outer member and said shoulder portion of said inner member, said spring biasing said outer member axially forcing said tapered inner wall against said spherical member thereby exerting a force onto said spherical member, wherein said force forcing said spherical member into engagement with the flat surface of the tool, thereby forcibly securing the tool within said axial bore and preventing the tool from rotating within said axial bore; and retaining means disposed on said inner member for retaining said outer member around said spherical member.

17. A quick change adapter according to claim 16, wherein said second portion having internal threads adapted for receiving external threads of the spindle of the power tool, thereby coupling said quick change adapter to the power tool.

18. A quick change adapter according to claim 16, wherein said retaining means including a retaining ring surrounding said inner member.

19. A quick change adapter according to claim 16, wherein said axial bore is slightly larger than the tool thereby allowing said axial bore to concentrically align the tool.

20. A quick change adapter according to claim 16, wherein said axial bore has an internal ridge for retaining a screw therein.

* * * * *